United States Patent
Auerbach et al.

(10) Patent No.: US 9,280,496 B2
(45) Date of Patent: Mar. 8, 2016

(54) FORMAL VERIFICATION OF ARBITERS

(71) Applicant: International Business Machines Corporation, Armonk, NY (US)

(72) Inventors: Gadiel Auerbach, Jerusalem (IL); Fady Copty, Nazareth (IL); Viresh Paruthi, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 523 days.

(21) Appl. No.: 13/657,875

(22) Filed: Oct. 23, 2012

(65) Prior Publication Data

US 2014/0115217 A1    Apr. 24, 2014

(51) Int. Cl.
*G06F 17/50* (2006.01)
*G06F 13/14* (2006.01)

(52) U.S. Cl.
CPC ...................................... *G06F 13/14* (2013.01)

(58) Field of Classification Search
CPC ............. G06F 17/504; G06F 17/5045; G06F 17/5022; G06F 17/505; G06F 11/3608
USPC .......................................... 716/106–107, 111
See application file for complete search history.

(56) References Cited

U.S. PATENT DOCUMENTS

| | | | |
|---|---|---|---|
| 7,712,060 B1* | 5/2010 | Garg et al. ..................... | 716/106 |
| 2006/0236010 A1 | 10/2006 | O'Connor et al. | |
| 2009/0259705 A1* | 10/2009 | Kailas et al. .................. | 708/255 |
| 2009/0282178 A1* | 11/2009 | Kailas .................. | G06F 13/364 |
| | | | 710/244 |
| 2011/0320659 A1 | 12/2011 | Ambroladze et al. | |

OTHER PUBLICATIONS

Kailas et al., "Formal verification of correctness and performance of random priority-based arbiters", FMCAD 2009 Formal Methods in Computer-Aided Design, 2009, pp. 101-107, Nov. 2009.
Auerbach et al., "Formal verification of arbiters using property strengthening and underapproximations", (FMCAD), 2010 Formal Methods in Computer-Aided Design, pp. 21-24, Oct. 2010.

* cited by examiner

*Primary Examiner* — Nghia Doan
(74) *Attorney, Agent, or Firm* — Ziv Glazberg

(57) ABSTRACT

A computer-implement method, computerized apparatus and computer program product for formal verification of an arbiter design. The method comprising: performing formal verification of an arbiter design, wherein the arbiter design is based on an original arbiter design comprising a fairness logic and an arbitration logic, wherein the arbiter design comprising the arbitration logic and a portion of the fairness logic; and wherein the formal verification is performed with respect to a multi-dimensional Complete Random Sequence (CRS) having two or more dimensions.

18 Claims, 4 Drawing Sheets

FORMAL VERIFICATION OF ARBITERS

TECHNICAL FIELD

The present disclosure relates generally to formal verification and, more particularly to formal verification of arbiters in a design.

BACKGROUND

Arbiters are widely used in electronic systems such as microprocessors and interconnects. Arbiters restrict access to shared resources when the number of requests exceeds the maximum number of requests that can be satisfied concurrently. Arbiters may select the order of access to a shared resource, when several requests are co-pending. Efficient arbiters may require that the arbitration function is performed quickly as long decision time may add to the memory access time and may also increase the effective memory cycle time. Efficient arbiters may be bug-prone. See, for example, David J. Kinniment, Synchronization and Arbitration in Digital Systems, PROC. IEE, Vol. 123, No 10, October 1976 961-966, which is hereby incorporated by reference.

Arbiters are widely used in both synchronous and asynchronous contexts.

One concern in verification of an arbiter design is checking for starvation. Starvation is a special case of liveness properties, in which any request must eventually be granted. Liveness properties are often computationally hard to verify even on medium-sized designs. To alleviate this, it is common to check for starvation by replacing liveness properties with bounded properties—"request will be granted within N cycles", for some constant N. If a bounded property passes, it implies the correctness of the original liveness property while providing insight into the performance aspects of the arbiter. Even so, the sheer size of industrial arbiters may preclude an exhaustive analysis of the bounded property.

BRIEF SUMMARY

One exemplary embodiment of the disclosed subject matter is a computer-implemented method performed by a processor, the method comprising: performing formal verification of an arbiter design, wherein the arbiter design is based on an original arbiter design comprising a fairness logic and an arbitration logic, wherein the arbiter design comprising the arbitration logic and a portion of the fairness logic; and wherein the formal verification is performed with respect to a multi-dimensional Complete Random Sequence (CRS) having two or more dimensions.

Another exemplary embodiment of the disclosed subject matter is a computerized apparatus having a processor, the processor being adapted to perform the steps of: performing formal verification of an arbiter design, wherein the arbiter design is based on an original arbiter design comprising a fairness logic and an arbitration logic, wherein the arbiter design comprising the arbitration logic and a portion of the fairness logic; and wherein the formal verification is performed with respect to a multi-dimensional Complete Random Sequence (CRS) having two or more dimensions.

Yet another exemplary embodiment of the disclosed subject matter is a computer program product comprising: a non-transitory computer readable medium retaining program instructions, which instructions when read by a processor, cause the processor to perform the steps of: performing formal verification of an arbiter design, wherein the arbiter design is based on an original arbiter design comprising a fairness logic and an arbitration logic, wherein the arbiter design comprising the arbitration logic and a portion of the fairness logic; and wherein the formal verification is performed with respect to a multi-dimensional Complete Random Sequence (CRS) having two or more dimensions.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
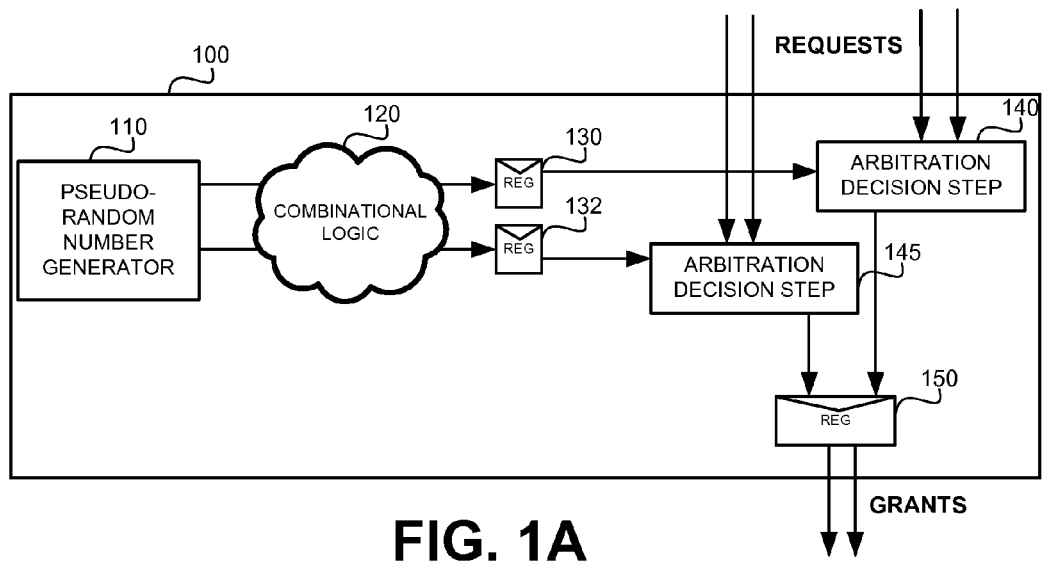
FIG. 1A-1D show schematic illustrations of arbiter designs, in accordance with the disclosed subject matter.

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In the present disclosure, a "design" is a circuit, processor, or similar computerized device having computational capabilities. The design may be defined using a hardware description language such as VHDL, Verilog, SystemVerilog, or the like.

In the present disclosure, an "arbiter design" is a design providing the functionality of an arbiter. An arbiter design may comprise two distinguished circuitries: fairness logic and arbitration logic. Generally speaking, the fairness logic is in charge of determining the order in which requestors get their turn to be granted access to the shared resource; and the arbitration logic keeps track of the incoming requests and generates the grant permits based on the decisions by the fairness logic. The fairness logic may comprise a pseudo-random number generator, a round robin logic, a predetermined priority queue, or the like. The arbitration logic may determine which requestor to grant access according to the outcome of the fairness logic.

In some exemplary embodiments, the fairness logic reduces the possibility to formally verify the arbiter design using model checking techniques. In some cases, the fairness logic is sequentially deep which may be hard for model checkers the process. For example, the pseudo-random number generator used to select the next requestor to be granted access should necessarily produce unpredictable sequence of integers, hence it is inherently difficult to analyze.

In the present disclosure, a "multi-level arbiter" is an arbiter that decides which request to grant according to a multiple-step decision procedure, where in each step the arbiter chooses a class of requests. The arbiter combines the partial decisions of several sub-arbiters to ascertain a unified response. In some exemplary embodiments, the sub-arbiters may be performed concurrently, sequentially, in combination thereof, or in any other order.

One technical problem dealt with by the disclosed subject matter is to perform formal verification of arbiters. In some exemplary embodiments, the arbiter may be a multi-level arbiter, having multiple-step decisions.

Another technical problems is to embodiments, uncover any "harmonics" or dependencies across the multi-levels arbiters. Such dependencies may induce situations of starvation. In some cases, chips share a pseudo-random sequence of a single generator (such as but not limited to Linear Feedback Shift Register (LFSR)) among multiple arbiters that are sub-arbiters of a multi-level arbiter. Each arbiter may tap a different ordered subset of bits of the generated numbers. The tapped bits may undergo manipulations and may be stored and sampled few cycles after the random source produced them. The correctness of the arbitration scheme may rely on the independency of the taps, where dependency may cause for a particular requestor to not be prioritized/selected for a long period of time which may not agree with the performance and correctness requirements of the design.

The disclosed subject matter may distinguish between the sequence that the pseudo-random number generator produces and the tap bits that the arbitration logic receives, thereby allowing to uncover such dependencies.

One technical solution is to utilize a Complete Random Sequence (CRS) of multiple dimensions. The multi-dimension CRS may be a flag, a bit, or a similar component of the design which indicates that a complete sequence of all possible combinations of values at each of the dimensions being monitored, having any order (i.e., random sequence), was seen. The multi-dimension CRS may be used to enforce a fairness condition on the environment of the arbiter that asserts that every value that may be provided is being generated by the environment infinitely many times. The signal CRSdetected may be defined to indicate the detection of a single CRS while a request is pending. The fairness condition may be expressed as the following Property Specification Language (PSL) property: always eventually! CRSdetected. In some exemplary embodiments, a bounded-fairness condition may be expressed as an assertion that is expressed in PSL as: always request→next_e[1:N] CRSDetected.

In some exemplary embodiments, each dimension of the multi-dimension CRS may correspond to a different decision step of a multi-level arbiter. Additionally or alternatively, each dimension may correspond to a different output cycle. In some exemplary embodiments, combination of these or other monitored values may be used.

Another technical solution is to decouple the arbiter design to fairness logic and to arbitration logic. The fairness logic of the arbiter may comprise a pseudo-random mechanism useful for the implementation of the fairness scheme, such as pseudo-random number generator-based random priority selection, round robin, weighted priority, or the like. The pseudo-random mechanism may be replaced by a non-deterministic input for the purpose of formal verification. The non-deterministic input may be constrained by the environment, such as using a bounded-liveness property which is based on the multi-dimension CRS.

In some exemplary embodiments, the arbiter design may be formally verified using formal verification methods. In some exemplary embodiments, the formal verification may be performed using model checking of the arbiter design with respect to target specification. In some exemplary embodiments, the arbiter design may be verified for non-starvation behavior when a multi-dimension CRS is encountered. Additionally or alternatively, the fairness logic may be formally verified to ensure that the multi-dimension CRS is always reachable within a bounded number of cycles.

One technical effect is providing for a scalable formal verification technology for arbiters. In some exemplary embodiments, the verification of the fairness logic and the arbitration logic is performed separately. In some exemplary embodiments, when verifying the arbitration logic, the complexity of the fairness logic may be avoided without providing for spurious starvation bugs which are based on the non-deterministic input that is used to simplify the fairness logic.

Another technical effect is enabling to obtain proof of correctness of the arbitration logic. In some exemplary embodiments, bug-finding techniques can be used in addition in a structured a step-by-step verification strategy which gradually switches gears from falsification to obtaining proofs.

Referring now to FIG. 1A showing a schematic illustration of an original multi-level arbiter design, which is the given design to be formally verified, in accordance with the disclosed subject matter. Arbiter 100 is a multi-level arbiter comprising a fairness logic and a multi-step arbitration logic. The fairness logic may include a Pseudo-Random Number Generator 110 and logic based thereof, such as Combinational Logic 120 and/or Temporal Logics 130, 132. The multi-step arbitration logic may include Arbitration Decision Steps 140, 145, and/or Temporal Logic 150.

Based on requests to Arbiter 100, grants may be provided according to the fairness logic. The selection schemes for selection of the requests at the different levels could be combination of known selection schemes such as, but not limited to, pseudo-random number generator-based random priority selection, round robin, weighted priority, and the like. The combination of selection scheme may yield a compound selection strategy which may be a cross-product of the implemented schemes at the various levels.

Pseudo-Random Number Generator 110, such as an LFSR, may be designed to provide a input that simulates random input, using pseudo-random means. This may introduce complexity to the arbiter design which may be a challenge in formally verifying Arbiter 100.

In some exemplary embodiments, Arbiter 100 may include several Pseudo-Random Number Generators such as 110, each used for providing random number for different arbitration decision steps. Additionally or alternatively, a single Pseudo-Random Number Generator may be used to provide several random numbers such as by taping different bits of the random numbers generated by the generator. For example, if the generator generates numbers represented in 20 bits, it may be used for providing two numbers, one represented in 3 bits and the other in 5 bits.

Figure 1B:
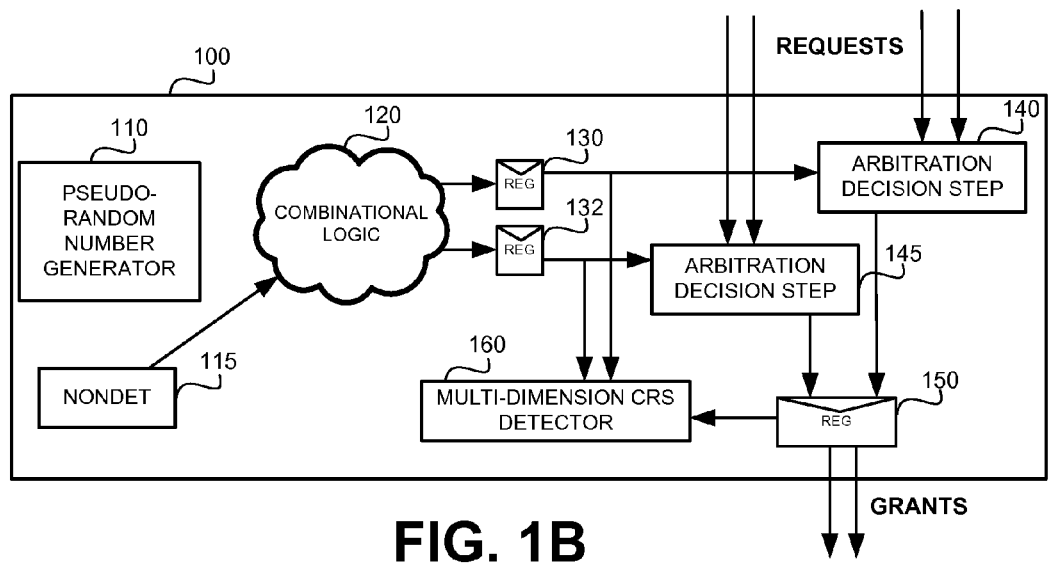

Referring now to FIG. 1B showing a schematic illustration of a multi-level arbiter design, in accordance with the disclosed subject matter. The original design shown in FIG. 1A may be modified in accordance with the disclosed subject matter. Design of Aribter 100 may be modified, such as by modifying a VHDL, Verilog, or similar hardware description language defining Arbiter 100. The modified arbiter may replace the input provided by Pseudo-Random Number Generator 110 with a non-deterministic input (Nondet 115). The absence of a scenario in which starvation occurs, or other properties relating to the functionality of the arbiter may be verified using formal verification methods, such as using explicit model checkers, symbolic model checkers, such as Binary Decision Diagrams (BDDs)-based model checkers and SAT-based model checkers, or the like. As non-deterministic input is used, starvation may occur due to the non-deterministic nature of the input. However, under the assumption of "fair" input, the Arbiter's functionality to avoid starvation can be checked. Such assumption may be applied on the model by using a fairness condition constraining the non-deterministic input to be "fair". The fairness condition may be based on a complete random sequence—ensuring that a complete sequence of values, at any order, is always seen before starvation is detected.

A Multi-Dimension CRS Detector 160 may be introduced to detect a complete random sequence on two or more dimensions. Multi-Dimension CRS Detector 160 may monitor two or more dimensions of information for a Complete Random Sequence of the cross-product of the two or more dimensions. In some exemplary embodiments, Multi-Dimension CRS Detector 160 may monitor two dimensions corresponding to input provided to Arbitration Decision Step 140 (e.g. output of Temporal Logic 130) and to input provided to Arbitration Decision Step 145 (e.g. output of Temporal Logic 132), respectively. In some exemplary embodiments, Multi-Dimension CRS Detector 160 may raise a bit, a flag, or a similar signal, in response to monitoring a complete random sequence of the two or more dimensions. The signal may be used as a basis for a bounded or unbounded fairness condition to be used for formal verification, to ensure that any starvation detected occurs due to the arbitration logic and not due to the non-deterministic inputs provided by Nondet 115.

It will be understood that if the first dimension comprises three values (a,b,c), and the second dimension comprises two values (x,y), than a multi-dimensional CRS comprises seeing all combinations of values (i.e., [a,x], [a,y], [b,x], [b,y], [c,x], [c,y]) and not simply seeing all possible values (i.e. the sequence: [a,x], [b,y], [c,x], is not a multi-dimensional CRS).

Figure 1C:
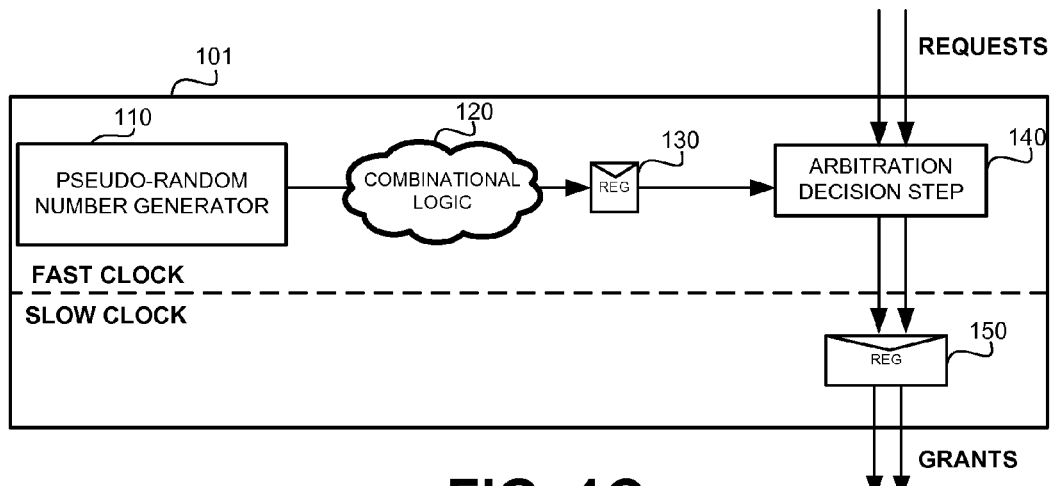

Referring now to FIG. 1C showing a schematic illustration of an original multi-level arbiter design, which is the given design to be formally verified, in accordance with the disclosed subject matter. Arbiter 101 is an arbiter comprising a fairness logic and an arbitration logic. The fairness logic may include a Pseudo-Random Number Generator 110 and logic based thereof, such as Combinational Logic 120 and/or Temporal Logics 130. The arbitration logic may include Arbitration Decision Step 140, and/or Temporal Logic 150.

Arbiter 101 has different clock cycles for different portions thereof. A first portion is based on a first clock which is said to be "slow", and second portion uses a "fast" clock. It will be understood that slow and fast are relative terms used to compare between these two clocks. As an example, during one cycle of the slow clock, two or more cycles of the fast clock may occur. In such a case, as the grants are provided by Arbiter 101 by the fast clock, it may be verified that any CRS seen by the arbitration logic is indeed relevant to the sampled input which is provided to Temporal Logic 150 and based thereof the grants are provided.

Figure 1D:
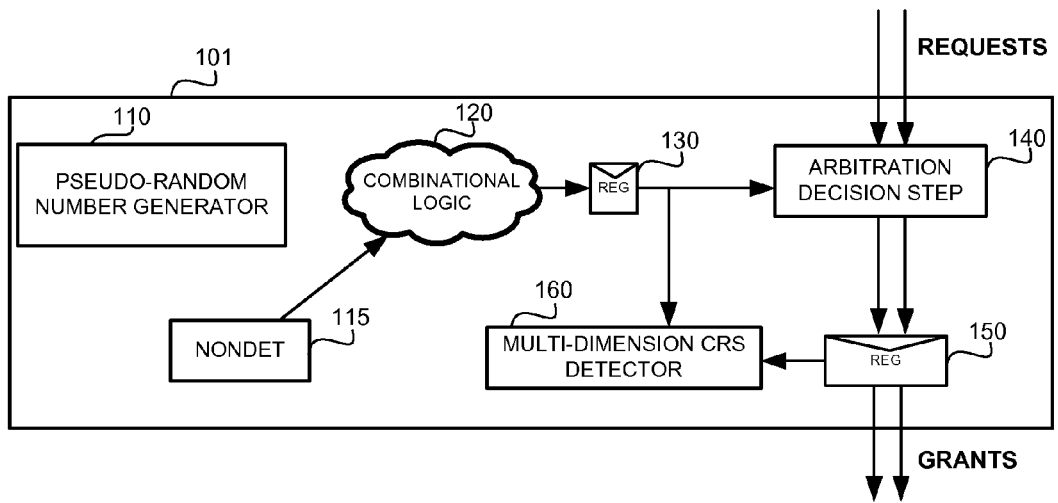

Aribter 101 is said to have multiple calculation cycles ("fast" clock) per output cycle ("slow" clock). In case the clock domain of the grants is slower than the clock domain of the arbiter and its requests, the arbiter may provide grants but the receiving domain might not be able to sample them. If the receiving domain samples the grants every two fast clock cycles, in order to identify non-spurious starvation, it may be required to observe two consecutive cycles. In some exemplary embodiments, such a design may be seen as equivalent to adding another register at the output of the arbiter that stores any grant for two cycles. In some exemplary embodiments, and is shown in FIG. 1D, Multi-Dimensional CRS Detector 160 may be used to monitor values of a tap at pairs of consecutive cycles. In some exemplary embodiments the monitored value may be those stored at a register, such as in 150.

Referring now to FIG. 1D showing a schematic illustration of an arbiter design, in accordance with the disclosed subject matter. The original design shown in FIG. 1C may be modified as follows. Design of Aribter 101 may be modified. The modified arbiter may replace the input provided by Pseudo-Random Number Generator 110 with a non-deterministic input (Nondet 115).

Multi-Dimension CRS Detector 160 may be used to monitor inputs to the arbitration logic (i.e., input to Arbitration Decision Step 140, which is provided from Temporal Logic 130) at consecutive cycles. The number of cycles that are monitored may be bounded by the ratio between output cycles and calculation cycles. Multi-Dimension CRS Detector 160 may be used to monitor values in different calculation cycles. A multi-dimensional CRS may be detected if a complete sequence of all combination of values in all dimensions is detected.

Based on a signal provided by Multi-Dimension CRS Detector 160, a fairness condition may be defined to provide a constraint over Nondet 115 to avoid artificial starvation which is caused by the slow sampling rate of the receiving domain.

In some exemplary embodiments, the original arbiter, such as 100 or 101, may have the fairness logic and arbitration logic connected. In some exemplary embodiments, manual decoupling of the different logics may be performed by a user, such as a verification engineer. Additionally or alternatively, decoupling may be performed automatically such as based on structure analysis of the arbiter and comparison to predetermined templates. In some exemplary embodiments, the arbitration logic and the fairness logic may be initially decoupled and having an interface therebetween of one or more signals as is exemplified in FIG. 1A and FIG. 1C. In some exemplary embodiments, a user may identify the input signals to the arbitration logic and/or the output signals from the fairness logic. Additionally or alternatively, the interface may be identified automatically.

Figure 2:
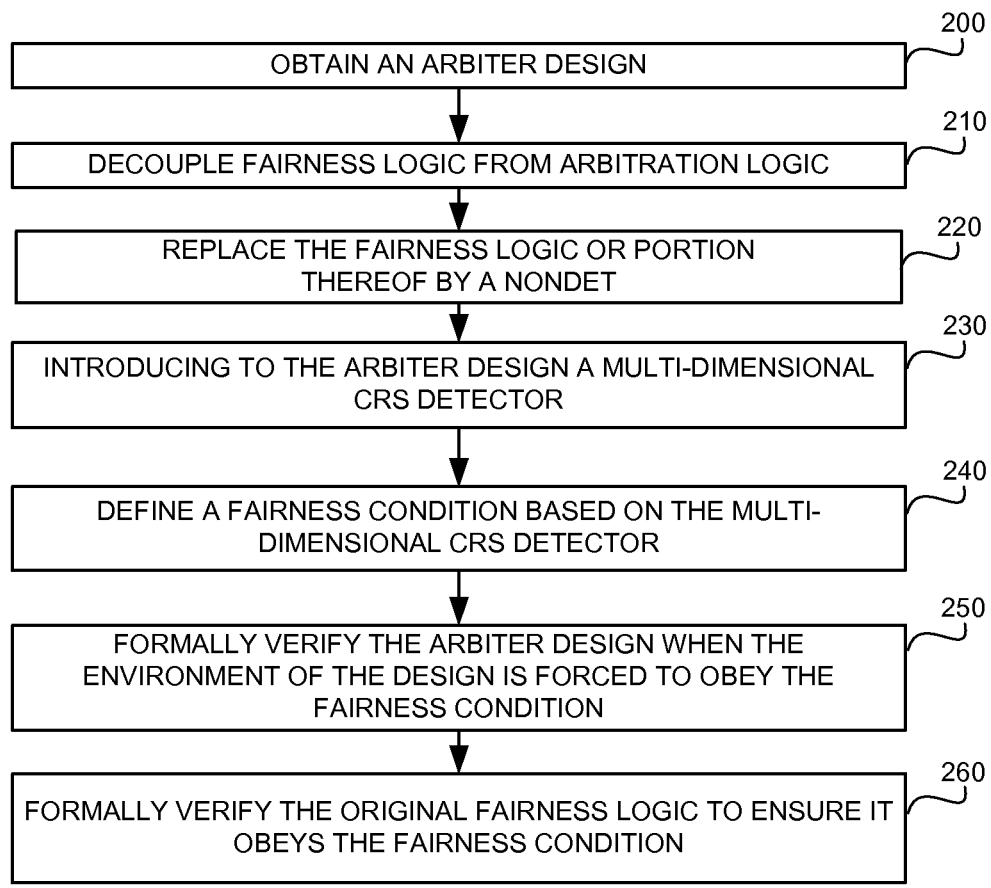
FIG. 2 shows a flowchart diagram of steps in a method, in accordance with some exemplary embodiments of the disclosed subject matter.

Referring now to FIG. 2 showing a flowchart diagram of steps in a method, in accordance with some exemplary embodiments of the disclosed subject matter.

In Step 200, an arbiter design, such as depicted in FIG. 1A or 1C, is obtained. The design may be provided in a computer-readable format, such as in VHDL, Verilog, SystemC, or the like. In some exemplary embodiments, the arbiter may be a multi-level arbiter. Additionally or alternatively, the arbiter may interface with two or more different clock domains. In some exemplary embodiments, arbiter may comprise other multi-level aspects or combination of such multi-level aspects thereof.

In Step 210, the fairness logic may be decoupled from the arbitration logic. In some exemplary embodiments, the decoupling may be performed manually, semi-automatically or automatically. The decoupling may result in the fairness logic and the arbitration logic having a cut point therebetween that functions as an interface for providing the arbitration logic with input from the fairness logic.

In Step 220, the fairness logic or portion thereof may be replaced by a non-deterministic input. The nondet input may be provided to the design as a nondet variable defined by the environment of the design. In some exemplary embodiments, the nondet input may simplify the design. In some exemplary embodiments, the nondet may replace a pseudo-random number generator, which may be the entire fairness logic or a portion thereof.

In Step 230, a multi-dimensional CRS detector may be introduced to the arbiter design. The CRS detector may be configured to detect whether a CRS of two or more dimensions is detected. The dimensions may correspond to different arbitration decision steps, output cycles, or the like.

In Step 240, a bounded fairness condition may be defined based on the multi-dimensional CRS detector.

In Step 250, the arbiter design may be formally verified. Formal verification may be performed to ensure that the arbiter holds a desired property. The environment of the design may be defined to respect the fairness condition.

In some exemplary embodiments, the desired property may be a user-defined property or a property that should be held by every arbiter, such as every no starvation or that each request is eventually granted. In some exemplary embodiments, the property may be a liveness property. Additionally or alternatively, the property may be a safety property. In some exemplary embodiments, a liveness property may be simplified to a safety property by bounding it, such as by defining that for every request, a grant is provided during a predetermined number of clock cycles, such as within 20,000 cycles.

In some exemplary embodiments, formal verification may be performed using a model checker, such as an explicit model checker, a symbolic model checker, or the like.

In Step 260, the verification of the original arbiter may be complemented by verifying that the fairness condition is held by the fairness logic. If the fairness condition is held, than together with a proof that under the fairness condition the arbitration logic holds a desired property, than it can be deduced that the arbiter holds the desired property.

In some exemplary embodiments, other methods, such as non-formal verification (e.g., simulation-based verification, test generation-based verification, manual testing, or the like) may be employed for bug-hunting purposes instead of formal verification which may be used for validation purposes.

Figure 3:
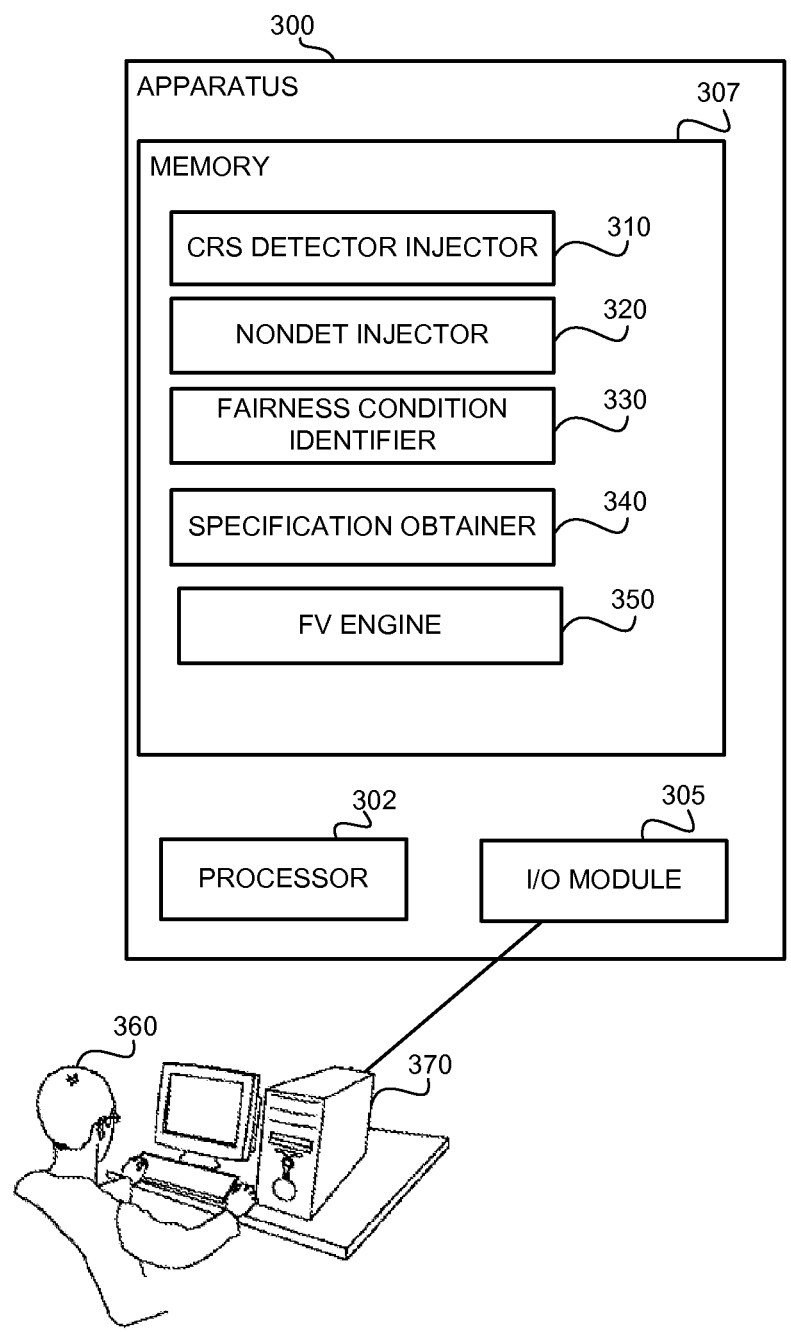
FIG. 3 shows a block diagram of components of an apparatus, in accordance with some exemplary embodiments of the disclosed subject matter.

FIG. 3 shows a block diagram of components of an apparatus, in accordance with some exemplary embodiments of the disclosed subject matter. An Apparatus 300 may be a computerized apparatus adapted to perform a method such as depicted FIG. 2.

In some exemplary embodiments, Apparatus 300 may comprise a Processor 302. Processor 302 may be a Central Processing Unit (CPU), a microprocessor, an electronic circuit, an Integrated Circuit (IC) or the like. Alternatively, Apparatus 300 can be implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). Processor 302 may be utilized to perform computations required by Apparatus 300 or any of it subcomponents.

In some exemplary embodiments of the disclosed subject matter, Apparatus 300 may comprise an Input/Output (I/O) Module 305 such as a terminal, a display, a keyboard, an input device or the like to interact with the system, to invoke the system and to receive results. It will however be appreciated that the system can operate without human operation. In some exemplary embodiments, a User 360, such as QA staff member, a verification engineer, a chip designer, an engineer, or the like, may interact with Apparatus 300 via a Man-Machine Interface (MMI) 370. User 360 may assist in identifying the interface between the fairness logic and the arbitration logic, in decoupling the logics from one another, to defining the dimensions of the multi-dimensional CRS, for defining a desired property to be verified, or the like.

In some exemplary embodiments, Apparatus 300 may comprise a Memory 307. Memory 307 may be persistent or volatile. For example, Memory 307 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, Memory 307 may retain program code operative to cause Processor 302 to perform acts associated with any of the steps shown in FIG. 2. In some exemplary embodiments, Memory 307 may retain the original arbiter design, the modified arbiter design or the like.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

A CRS Detector Injector 310 may be configured to inject to an arbiter design a CRS detector. In some exemplary embodiments, the CRS detector may be a multi-dimensional CRS detector. The injection may be automatic or assisted by user selection, such as identifying signals associated with the different dimensions (e.g., input signal to an arbitration decision step, input signal at every odd cycle, or the like).

A Nondet Injector 320 may be configured to inject to an arbiter design a nondet variable to replace the fairness logic or a portion thereof. The nodnet may replace a pseudo-random number generator utilized by the fairness logic. The injection may be automatic or assisted by User 360, such as by identifying the signals of the pseudo-random number generator that are utilized by the fairness logic.

A Fairness Condition Identifier 330 may be configured to define a fairness condition based on the CRS detector. In some exemplary embodiments, the fairness condition may be an unbounded fairness condition of the form "always eventually! CRSdetected". In some exemplary embodiments, the fairness condition may be a bounded-fairness condition such as: "always request→next_e[1:N] CRSDetected" or "never {request; !CRSDetected[*N]}" where N is some natural number.

A Specification Obtainer 340 may be configured to obtain a specification property to be verified. The specification property may be a predetermined property or a user-defined property. The property may be that each request is eventually granted. In some exemplary embodiments, the property may be a bounded property such as that each request is granted within a bounded number of cycles and as long as the CRS is detected.

A Formal Verification Engine 350 may be configured to perform formal verification on the arbiter design, given its associated environment and the specification property. In some exemplary embodiments, FV Engine 350 may be a model checker.

An Embodiment

In one embodiment, a multi-level arbiter has functionality equivalent to a single-level arbiter. The equivalent single-level arbiter chooses between $n\_1~x, \ldots, x~n\_1$ requests, and it has a single random-number generator that concatenates the outputs of the '1' random-number generators.

The following example describes an arbiter that allows access to a memory of a processor. The processor has 8 units, and each unit has 4 ports. All 32 ports may simultaneously request access to the memory while the shared memory can handle only one request at a time. The arbiter serves as an illustrative example to depict an embodiment of the disclosed subject matter.

Example: The arbiter regulates access to a shared memory. The arbiter may choose 1 request out of 32 requests using two sub arbiters: an 8-to-1 and a 4-to-1 LFSR-based arbiters. The 8-to-1 arbiter chooses a winning unit, and 4-to-1 arbiter chooses a winning port, the combination of the two results determines the winning request. In some exemplary embodiments, the analysis may treat the two sub arbiters as independent.

In some exemplary embodiments, a property that asserts that the arbiter eventually grants every request may be checked. The PSL property that corresponds to the arbiter above may be, for example:

forall i in 1 . . . 32:
   always req(i)→eventually! gnt(i)

Checking liveness properties may not be readily applicable to complex arbiters due to limitations of the underlying formal verification tools. In some cases, the scope of the model may be reduced to allow the verification tools to verify the design. The arbitration logic may be decoupled from the random-number generator. The arbitration logic standalone may be verified. In the case of a multi-level arbitrator, the formal verification environment may over-approximate the two or more random-number generators used by the fairness logic and replace them with non-deterministic variables. A fairness condition may be enforced on the environment. The fairness condition may assert that every number in the range of the random-number generator (CRS) is being generated by the environment infinitely many times. A signal denoted as CRSdetected may be defined to indicate a detection of a single CRS while a request is pending. The fairness condition may be expressed as the following PSL property:

always eventually! CRSdetected

In some exemplary embodiments, the model checking instance may still be too big to be verified using formal methods. To overcome such an obstacle, the liveness assertion may be repalaced with a bounded-liveness assertion.

The definition of CRS suits a single-level arbiter that has a single random source, and not applicable to multi-level arbiters. The following definition extends the original CRS definition so it suits many independent random sources.

Definition: Given an l-level arbiter, such that the i-th sub arbiter chooses between $n\_i$ requests, a multi-dimensional complete random sequence is a sequence of l-tuples that contains all $n\_1~x, \ldots, x~n\_1$ combinations of possible results of the random generators.

A multi-dimensional CRS may be implanted using an l-dimensional matrix that consists of $n\_1~x, \ldots, x~n\_1$ Boolean indicators. The entry $<i\_1, \ldots, i\_l>$ may be set when there is a pending request and outputs of random sources are equal to $<i\_1, \ldots, i\_l>$. The entry may be reset when there is no pending request. For the memory-controller arbiter in the example, a two-dimensional CRS using a 8×4 matrix of Booleans may be used. The signal CRSdetected may be set when all the entries in the matrix are set. The bounded-liveness assertion using the following PSL property:

never {req; !gnt[*]; CRSdetected & !gnt}!

The property fails if a request is not granted after a CRS is detected.

Per the aforementioned construction, verification of a multi-level arbiter consumes the same amount of environment variables as the verification of the equivalent single-level arbiter, and the length of traces in both arbiters are the same.

A similar scheme of keeping track of occurrence of all combinations of random numbers via the 1-dimensional matrix can be used to ascertain worst case latency of the actual random number generators (LFSRs) used to select the requestors at the different levels of the multi-level arbitration scheme. The random number sources can be initialized randomly and checked for CRSdetected to assert in the least possible as well as maximum possible amount of time to help compute bounds on the performance characteristics of the arbitration logic as a whole inclusive of the arbiter and the fairness scheme.

The aforementioned construction may uncover any "harmonics" or dependencies across the multi-levels arbiters. Chips often share a pseudo-random sequence of a single generator (LFSR) among multiple arbiters. Each arbiter taps a different ordered subset of bits of the generated number (in the above example, each arbiter tapped 3 bits from a sequence of 16-bit numbers). The tapped bits may undergo manipulations and may be stored and sampled few cycles after the random source produced them, as shown in FIG. 1. The correctness of the arbitration scheme relies on the independency of the taps, where dependency may cause for a particular requestor to not be prioritized/selected for a long period of time which may not agree with the performance requirements of the design. The disclosed subject matter distinguishes between the sequence that the pseudo-random number generator produces and the tap bits that the arbitration logic receives. The pseudo-random numbers are regarded as independent, so they are overridden with nondeterministic variable. The arbitration logic receives those nondeterministic after they were manipulated by the Design Under Verification (DUV), such as by the fairness logic's combinatorial logic and/or temporal logic. The CRS detector monitors the numbers that the arbitration logic receives. If not for this step the individual arbiters could have been verified standalone and the results combined which would not be representative of the actual design and interdependencies between fairness schemes at the various levels.

The disclosed subject matter is extendable to different fairness schemes such as round robin, priority-based etc. and combinations thereof, such as for example, by suitably keeping track of selection of a particular requestor and checking to see all combinations across the collection of schemes have occurred via the 1-dimensional matrix.

In some exemplary embodiments, a partial multi-dimensional CRS detection scheme may be used. In such a scheme instead of ensuring that all combinations were detected, a subset thereof may be considered as sufficient, such as a diagonal of the matrix of combination of values, two diagonals of the matrix, two or more rows or columns of the matrix, or the like.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a processor, the method comprising:

obtaining an arbiter design to be formally verified, wherein the arbiter design is based on an original arbiter design comprising a fairness logic and an arbitration logic, wherein the arbiter design comprising the arbitration logic and a portion of the fairness logic;

generating, using the portion of the fairness logic, values to be provided as input to the arbitration logic;

monitoring the values generated using the portion of the fairness logic and provided as input to the arbitration logic to allow detection of a multi-dimensional Complete Random Sequence (CRS) having two or more dimensions, wherein each dimension corresponds to a different sequence of the values being monitored; and, performing formal verification of the arbiter design, wherein the formal verification is performed to verify a property is held by the arbiter design with respect to a bounded or unbounded fairness condition which is based on the multi-dimensional CRS, whereby the arbitration logic is formally verified independently of the fairness logic.

2. The method of claim 1, wherein the arbiter design is a multi-level arbiter design having two or more decision steps, and wherein each dimension of the multi-dimension CRS corresponds to a different decision step of the multi-level arbiter design.

3. The method of claim 1, wherein an output of the arbiter design is delayed within the arbiter design for more than one cycle, and wherein each dimension of the multi-dimension CRS corresponds to a different calculation cycles of the arbiter design.

4. The method of claim 1, wherein the arbiter design configured to receive a non-deterministic input, wherein the non-deterministic input replaces the fairness logic or portion thereof.

5. The method of claim 4, wherein the fairness logic comprises a pseudo-random number generator that is replaced by the non-deterministic input.

6. The method of claim 5, wherein the pseudo-random number generator is a Linear Feedback Shift Register.

7. The method of claim 1, further comprising, manually or automatically, decoupling the fairness logic and the arbitration logic in the original arbiter design and defining the arbiter design.

8. The method of claim 1, wherein multi-dimensional CRS ensures that a predefined subset of all possible combinations of values at the two or more dimensions are observed during the formal verification.

9. The method of claim 1, wherein multi-dimensional CRS ensures that all possible combinations of values at the two or more dimensions are observed during the formal verification.

10. The method of claim 1, wherein the formal verification is performed by model checking the arbiter design.

11. The method of claim 1, wherein the arbiter design comprising a CRS detector configured to monitor input provided to the arbitration logic to determine whether a complete random sequence of the two or more dimensions is observed.

12. The method of claim 1, wherein the arbiter design is retained in a non-transitory computer-readable medium.

13. The method of claim 1, wherein the fairness logic is configured to provide the arbitration logic with two or more numbers.

14. A computerized apparatus having a processor, the processor being adapted to perform the steps of:

obtaining an arbiter design to be formally verified, wherein the arbiter design is based on an original arbiter design comprising a fairness logic and an arbitration logic, wherein the arbiter design comprising the arbitration logic and a portion of the fairness logic;

generating, using the portion of the fairness logic, values to be provided as input to the arbitration logic;

monitoring the values generated using the portion of the fairness logic and provided as input to the arbitration logic to allow detection of a multi-dimensional Complete Random Sequence (CRS) having two or more dimensions, wherein each dimension corresponds to a different sequence of the values being monitored; and, performing formal verification of the arbiter design, wherein the formal verification is performed to verify a property is held by the arbiter design with respect to a bounded or unbounded fairness condition which is based on the multi-dimensional CRS, whereby the arbitration logic is formally verified independently of the fairness logic.

15. The computerized apparatus of claim 14, wherein the arbiter design is a multi-level arbiter design having two or more decision steps, and wherein each dimension of the multi-dimension CRS corresponds to a different decision step of the multi-level arbiter design.

16. The computerized apparatus of claim 14, wherein the arbiter design configured to receive a non-deterministic input, wherein the non-deterministic input replaces the fairness logic or portion thereof.

17. The computerized apparatus of claim 16, wherein the fairness logic comprises a pseudo-random number generator that is replaced by the non-deterministic input.

18. A computer program product comprising:

a non-transitory computer readable medium retaining program instructions, which instructions when read by a processor, cause the processor to perform the steps of:

obtaining an arbiter design to be formally verified, wherein the arbiter design is based on an original arbiter design comprising a fairness logic and an arbitration logic, wherein the arbiter design comprising the arbitration logic and a portion of the fairness logic;

generating, using the portion of the fairness logic, values to be provided as input to the arbitration logic;

monitoring the values generated using the portion of the fairness logic and provided as input to the arbitration logic to allow detection of a multi-dimensional Complete Random Sequence (CRS) having two or more dimensions, wherein each dimension corresponds to a different sequence of the values being monitored; and, performing formal verification of the arbiter design, wherein the formal verification is performed to verify a property is held by the arbiter design with respect to a bounded or unbounded fairness condition which is based on the multi-dimensional CRS, whereby the arbitration logic is formally verified independently of the fairness logic.

\* \* \* \* \*